INVENTOR.
WILLIAM F. POTTS.

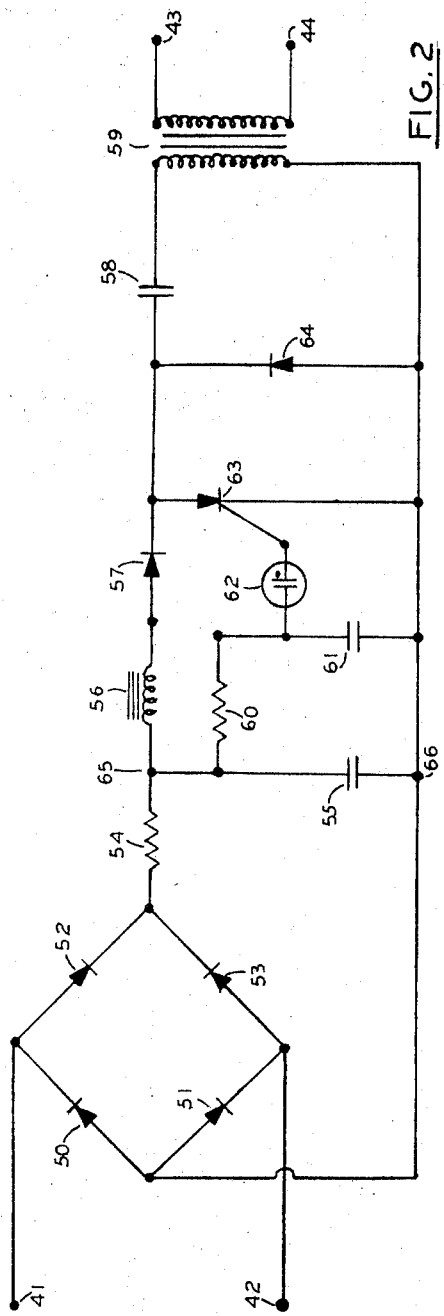
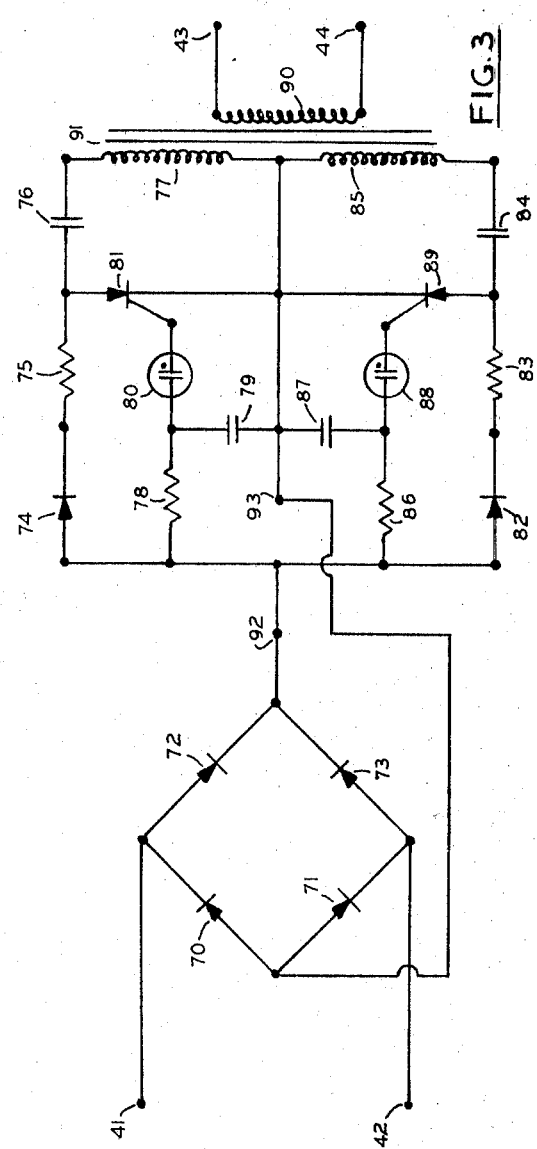

United States Patent Office 3,425,780
Patented Feb. 4, 1969

3,425,780
FLUID FUEL IGNITER CONTROL SYSTEM
William F. Potts, Liverpool, N.Y., assignor to Liberty Combustion Corporation, Syracuse, N.Y., a corporation of New York
Filed Sept. 26, 1966, Ser. No. 586,593
U.S. Cl. 431—68      9 Claims
Int. Cl. F23n 5/00, 5/20, 5/24

ABSTRACT OF THE DISCLOSURE

Ignition and control system for an oil burner having a cone spray of oil and a blower, and electrodes just outside the spray cone but in the blower air stream, the system includes a unitary apparatus having repetitive capacitance oscillatory spark discharge each of a size and duration capable of being diverted by the air stream into the cone spray for ignition and control apparatus, and time delay circuitry providing a specific period for burner ignition, and a lock out with manual reset, and protection against ignition attempt when red hot refractory heat conditions exist in the combustion chamber.

---

This invention relates to oil burner ignition and control systems, and more particularly to a system employing solid state circuitry.

Where electric spark discharges are used as a means of igniting an oil-fueled burner it is important for safety reasons and for long-life of electrodes, that the spark discharge electrodes be located, relative to the combustible mixture of air and oil, so that oil is unable to impinge upon the electrodes. This location is necessary since oil on the electrodes quickly results in the formation of carbon deposits on the electrodes. Such deposits in time build up sufficiently to bridge the electrode gap completely so that a spark discharge cannot occur. Further, as the spark discharge gap narrows from its proper gap length because of carbon formation, the spark discharge will not be deflected adequately by the flow of combustion air, and ignition will become sporadic with attendant unsafe and unpleasant conditions resulting. Accordingly a satisfactory electric ignition means for ignition of an oil burner must be able to produce a spark of sufficient energy and duration so that the rapid flow of combustion air past the spark discharge electrodes and oil nozzle into the combustion chamber will deflect the spark into the fine mist of oil surrounding the cone of oil sprayed out of the oil nozzle.

Electrical spark ignition transformers and associated burner controls designed for use on ordinary oil burners, because of their nature and characteristics, have been contained in separate housings, positioned in separate locations and interconnected by additionally provided cabling. Furthermore, burners, transformers and controls are frequently manufactured by different companies and so may not be brought together as a burner system until they are installed in a heating unit, thereby leaving system performance in the hands of installation (i.e. non-factory) personnel. Additionally, both installation and servicing are complicated by interconnecting cables, separate locations for the equipment, more weight, more boxes and involve more work than need be. In addition, present equipment designs include components which have moving parts subject to wear, pitting of electrical contacts and, consequently, are subject to predictable deterioration and failure. The weight of ignition transformers and oil burner controls adds significantly to shipping costs.

An object of the present invention is to provide spark discharge voltage pulses of sufficient energy and duration to allow a resultant spark discharge at a pair of electrodes to be significantly deflected by a flow of air past the electrodes.

A further object of the present invention is to provide an oil burner control of improved reliability with no moving parts by the use of electronic semiconductor circuitry and components.

Another object of the present invention is to assemble both the spark voltage generator and the oil burner control on a single base, contained in a single housing of sufficiently small size to allow mounting in the same space and location as occupied heretofore by an ignition transformer alone.

Yet another object of the present invention is to simplify both the installation and the servicing of oil burner ignition and control by providing in a single housing an integrated system which may be readily removed for repairs, requires no separate mounting, and needs no interconnecting cables.

A still further objective of the present invention is to provide a single unit of considerably less weight by integration of a spark voltage generator using capacitor discharge principles with a control using semiconductor devices.

The present invention is also directed to a circuit using a time delay circuit to provide a specific period of time for burner ignition, failing which, the system is turned off and the circuit is put in a lock-out condition requiring manual reset. The circuit is further provided with protection against ignition attempts when red-hot refractory heat conditions exist within the combustion chamber.

The above and other objects and novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 2 is a schematic diagram showing the detailed circuitry of one capacitor discharge spark discharge voltage generator;

FIGURE 3 is a schematic diagram showing the detailed circuitry of a second capacitor discharge spark discharge voltage generator;

Figure 1:
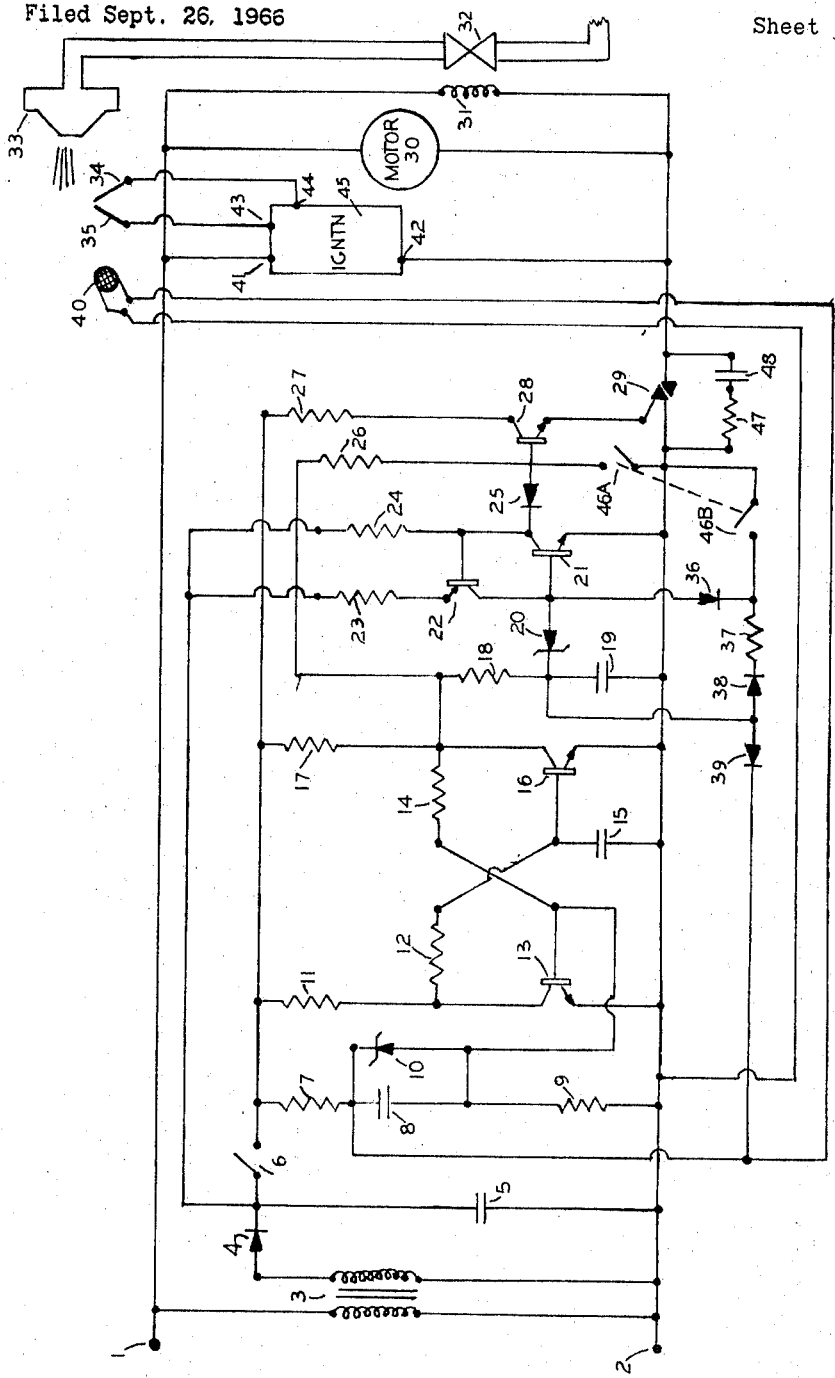
FIGURE 1 is a schematic diagram showing the detailed circuitry of the control interconnected with other elements of a complete burner system.

Referring to the drawings and particularly FIGURE 1, there are shown terminals of lines 1 and 2 connected to a 117 volt AC supply. A step down transformer 3, diode 4 and capacitor 5 provide a control operating voltage at thermostat switch 6 of about 24 volts DC, that is available so long as terminals of lines 1 and 2 are connected to the supply line. The lines 1 and 2 are connected to an ignition unit by leads 41 and 42, the circuitry of which may be that shown in FIGURES 2, 3 or 4, a burner motor 30 which may drive a blower and fuel pump and to the solenoid 31, of a combustible fluid fuel supply valve 32. The burner nozzle 33 is located in suitable relation to the spark gap 34 and 35. The line 2 is provided with a symmetrical or silicon gated switch 29, sometimes also referred to as a bidirectional triode thyristor or bidirectional controlled rectifier, for controlling current flow to the ignition unit 45, motor 30 and fuel valve solenoid 31. The thyristor may be of the type known under the trade name Triac. A cadmium sulphide cell 40 is located in sensing position to sense burner operation.

In order to initiate burner operation, it is essential that thermostatic switch 6 be closed, and that cell 40 be dark. When switch 6 closes, a positive DC potential is applied to resistors 7, 11, 17 and 27. If cell 40 is dark and so has a very high resistance, the base of NPN transistor 13 will immediately draw current through resistor 7 and Zener diode 10, thereby causing transistor 13 to saturate with a collector to emitter voltage of less than 0.2 volt. When transistor 13 saturates, the base of NPN transistor 16 cannot draw current and remains cut off. Capacitor 15, connected from the base of of transistor 16 to the common line 2, provides a very short delay so that when switch 6 first closes, the base of transistor 13 will draw current before the base of transistor 16, thereby assuring that transistor 13 saturates and transistor 16 remains cut off. With transistor 16 in a cut-off state, the base of NPN transistor 28 will draw current through resistor 17, resistor 26, its own base-emitter section and the gate-anode section of bidirectional triode thyristor 29 and transistor 28 will saturate. When transistor 28 saturates the gate of thyristor 29 will draw current from the positive DC voltage source through resistor 27 and the collector-emitter section of transistor 28, thereby allowing the anode 1–anode 2 region of thyristor 29 to conduct in either direction, depending upon the varying polarity of the AC voltage applied. When thyristor 29 conducts, AC voltage is applied to ignition unit 45, motor 30 and solenoid 31 thereby energizing them to operate in their normal mode. Solenoid 31 opens fuel valve 32, motor 30 drives a blower fan and a full pump to cause an appropriate fuel/air mixture to issue at burner nozzle 33, and igniter unit 45 provides spark discharge voltage at electrodes 34 and 35 to cause sparks to occur between the electrodes. Electrodes 34 and 35 are located in a fixed position so that the sparks will ignite the fuel air mixture issuing at nozzle 33.

When transistor 16 is cut-off and cell 40 remains dark, for failure of the burner to ignite, capacitor 19 charges slowly through resistor 17 and resistor 18, the charging time being determined principally by resistor 18 and the value of capacitor 19. When capacitor 19 is charged to the breakdown voltage of Zener diode 20, the base of NPN transistor 21 draws current and this transistor saturates, thereby causing PNP transistor 22 to saturate. When transistor 22 saturates it allows the base of transistor 21 to draw current through resistor 23 and the emitter collector section of transistor 22, thereby locking transistors 21 and 22 in a state of saturation. With transistor 21 in saturation, the base voltage of transistor 28 drops to a low value and transistor 28 cuts-off thereby cutting off thyristor 29. Since resistors 23 and 24 are both connected to the constantly available source of positive DC voltage at the junction of diode 4 and capacitor 5, the lockout circuit stays in lock-out regardless of whether or not switch 6 is open or closed. The lock-out circuit is reset by switch 64B which when momentarily closed first causes the base voltage of transistor 21 to drop to the voltage drop across diode 36, this being sufficiently low to cause transistor 21 to cut off and in turn causing transistor 22 to cut off also; and second, allows capacitor 19 to discharge through diode 38, resistor 37 and switch 46B. The purpose of diode 39 is to provide a unilateral path for current to flow through cell 40 from resistor 18. The purpose of switch section 46A is to ensure that the thyristor is cut-off during manual reset.

When a flame results from the ignition of the fuel/air mixture at nozzle 33, cell 40, located in a suitable fixed position, is illuminated by the flame, and the internal resistance of cell 40 decreases to a relatively low value, drawing sufficient current through resistors 17 and 18 so that capacitors 19 cannot charge sufficiently to reach the breakdown voltage of Zener diode 20 with the result that the lockout circuit does not operate. So long as switch 6 is closed and cell 40 is illuminated by flame, the burner will continue to burn. During a burning period should the flame be extinguished for any reason and remain extinguished, cell 40 will go dark and capacitor 19 will charge up slowly to the point where Zener diode 20 will conduct to put the system into lockout.

Under certain conditions after switch 6 has opened, cell 40 may remain illuminated by dull or infrared light from the refractory in the combustion chamber of the burner. If switch 6 closes while cell 40 is so illuminated, capacitor 8 and resistor 9 are shunted by the low resistance of the cell, and the base of transistor 13 will not draw sufficient current to saturate and thus transistor 13 will not draw sufficient current to saturate and thus transistor 16 will saturate and prevent the system from turning on the thyristor. After a time when cell 40 becomes dark and its internal resistance increases greatly, capacitor 8 charges through resistor 7 and the combination of resistor 9 in parallel with resistor 14, in series with the saturated collector emitter of transistor 16, results in a voltage drop due to charging current across resistor 9, sufficient to cause transistor 13 to saturate, thereby cutting off transistor 16 to let the normal control sequences take place.

In operation, when heat is required, switch 6 closes to provide DC voltage to the control circuit. If the cadmium sulphide cell 40 is dark, i.e., not illuminated, its resistance is very high and consequently the flip-flop control circuit consisting of components 7 through 17 will allow NPN transistor 28 to saturate thereby causing current to flow in the gate-anode 1 section of thyristor 29 which in turn causes the thyristor 29 to become bi-directionally conductive. When the thyristor 29 conducts, it turns on the AC voltage from terminals 1 and 2 to ignition unit 45, to blower motor 30 and to fuel valve solenoid 31, thereby causing a fuel/air mixture to issue at burner nozzle 33 to be ignited by the spark occurring at electrodes 34 and 35, the resulting flame, in turn, illuminating cell 40. When cell 40 is illuminated its internal resistance is very low and this low resistance prevents the timing and lock-out circuit consisting of components 18 through 24 from functioning. The burner will continue to run until switch 6 opens.

If the fuel/air mixture fails to ignite, cell 40 will remain at a very high resistance and the timing-lockout circuit will run to the end of the timing period at which point the lockout circuit will operate to shut the system off and keep it locked off until reset switch 46 is manually closed momentarily.

If, when switch 6 first closes, cell 40 is illuminated the flip-flop circuit will change over to put transistor 16 into saturation, thereby preventing the thyristor 29 from conducting and preventing the AC voltage from reaching motor 30, ignitor 45 and solenoid 31 as previously described. Ignitor unit 45 may consist of a conventional AC line-operated transformer, a fast-sparking capacitive-discharge type of generator such as illustrated schematically in FIGURE 2, or a high-energy capacitive-discharge generator such as in FIGURE 3 or FIGURE 4, all three types being described in detail hereunder.

With reference to FIGURE 2, when an AC voltage, nominally of 117 volts, is applied to terminals 41 and 42, the full-wave rectifier consisting of diodes 50, 51, 52 and 53 and filter resistor 54 and capacitor 55, provide a DC voltage, nominally of 150 volts, reference point 65 being positive and reference point 66 being negative.

In operation, capacitor 58 charges from the positive DC point 65 through inductor 56, diode 57, capacitor 58 and the primary winding of ignition transformer 59.

Capacitor 58 charges initially from the positive DC point 65 through inductor 56, diode 57 and on through the primary winding of transformer 59 to the negative DC point 66. At the same time capacitor 61 charges through resistor 60 until the breakdown voltage of gas discharge tube 62 is reached. When the gas discharge tube 62 conducts, it allows current to flow in the gate of silicon controlled rectifier 63 to make the anode-cathode region of rectifier 63 conduct, thereby discharging capacitor 58 through the primary of transformer 59, the discharge current causing a very high voltage to be induced in the secondary of transformer 59. Diode 64 allows the flow of reverse oscillatory current after the initial discharge. When rectifier 63 conducts, it also connects the cathode of diode 57 to the negative DC point 66. However, as current tries to flow from positive point 65 through inductor 56 and diode 57 to negative point 66 it is resisted by the inductive effect of inductor 56 which does not allow the magnitude of the current to reach a high value before the silicon controlled rectifier 63 is turned off by the reverse oscillatory voltage across the primary of transformer 59. When rectifier 63 cuts off, the magnetic field around inductor 56 collapses to induce a voltage of such polarity that capacitor 58 is charged to almost twice the DC supply voltage. The values of resistor 60 and capacitor 61 are selected so that the time to charge capacitor 61 to the breakdown voltage of gas tube 63 is slightly longer than the charging time of capacitor 58. Spark-discharge voltage will be produced continuously in the above described manner as long as AC voltage is connected to terminals 41 and 42. The spark discharge voltage from the secondary winding of transformer 59 is connected to terminals 43 and 44 and may be connected through appropriate means to the electrodes of a spark gap as illustrated, for example, in FIGURE 1.

With reference to FIGURE 3, when an AC voltage, nominally of 117 volts is connected to terminals 41 and 42, it is rectified by a full wave bridge rectifier consisting of diodes 70, 71, 72, 73 to produce a continuous series of half-sinewave DC pulses at twice supply voltage frequency, between reference point 92 which is positive and reference point 93 which is negative. As each DC pulse increases from zero to its maximum value both capacitor 76 and capacitor 84 will charge to a value close to the peak value of the DC pulse. The charging path for capacitor 76 starts with positive point 92, through diode 74, resistor 75 through capacitor 76 and primary winding 77 of transformer 91 to negative point 93. The charging path for capacitor 84 starts at positive point 92 through diode 82 and resistor 83 to capacitor 84 and returns through primary winding 85 of transformer 91 to negative point 93. The values of capacitor 76 and primary 77 are such as to induce a very fast rising but short-lived high voltage in secondary winding whereas the values of capacitor 84 and winding 85 are chosen to induce a slower rising but much longer lasting voltage in secondary winding 90, the purpose of this arrangement being to initially ionize a spark gap with the fast-rising voltage and to provide a long lasting, high energy content spark with the slower rising voltage. Capacitor 76 is discharged into winding 77 through the silicon controlled rectifier 81 which acts as a gate triggered by the timing network consisting of resistor 78, connected to positive point 92 to allow charging current to flow into capacitor 79 and on to negative point 93. When the charge on capacitor 79 reaches the breakdown voltage of gas discharge tube 80, gas tube 80 conducts to allow gate current to flow in the silicon controlled rectifier 81 thus turning the rectifier on and causing capacitor 76 to discharge through winding 77.

Capacitor 84 is discharged into winding 85 through silicon controlled rectifier 89 which is gate triggered by the timing network consisting of resistor 86 connected to positive point 92 to allow charging current to flow into capacitor 87 and on to negative point 93. When the charge on capacitor 87 reaches the breakdown voltage of gas discharge tube 88, gas tube 88 conducts to allow current to flow in the gate of the silicon controlled rectifier 89 and thereby turning the rectifier on and causing capacitor 84 to discharge through winding 85. The values of resistor 78 and capacitor 79 are such that the gas tube 80 will conduct after the peak value of the DC pulses has been reached but before the DC pulse drops to zero. The values of resistor 86 and capacitor 87 are such that gas tube 88 conducts a few microseconds after gas tube 80, thus permitting the fast-rising output voltage to commence first.

Figure 4:
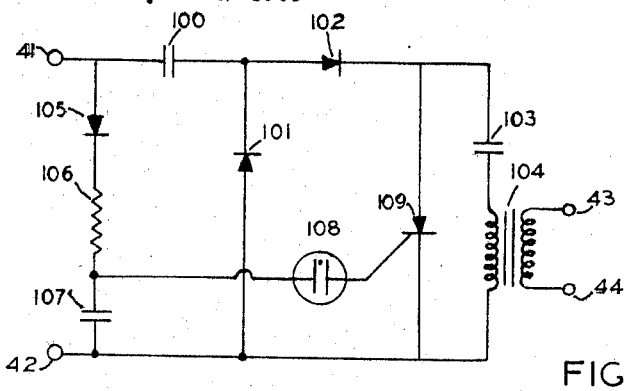
FIGURE 4 is a schematic diagram showing the detailed circuitry of a third capacitor discharge spark discharge voltage generator.

In FIGURE 4 there is shown what may be referred to as a preferred embodiment of a spark discharge voltage generator to produce spark discharges of sufficient energy and duration for oil burner ignition. When this voltage generator is connected into the circuit described in FIGURE 1, it has line voltage applied to terminals 41 and 42 as previously described.

When terminal 42 is positive, capacitor 100 will charge to the peak value, nominally 165 volts, of the line voltage, the plate of capacitor 100 connected to the cathode of diode 101 always being positive, the other plate always being negative. When terminal 41 is positive, the line voltage adds to the charge on capacitor 100 to charge capacitor 103 to twice the peak value of line voltage, capacitor 103 charging through diode 102 and the primary of winding of transformer 104. The plate of capacitor 103 connected to the cathode of diode 102 is positively charged while the other plate is negatively charged. Thus, in this arrangement, capacitor 103 may be charged to twice the peak value of line voltage on each cycle of the line voltage.

Diode 103, resistor 106, capacitor 107 and gas discharge tube 108 form a pulsing network to trigger the gate of silicon controlled rectifier 109, which triggering causes the anode-cathode section of rectifier 109 to become conductive. The pulse rate is determined primarily by the values of resistor 106 and capacitor 107 and may be adjusted to provide a maximum pulse rate equal to supply line frequency or as much slower a rate as may be desired, each triggering pulse occurring when the charge on capacitor 107 reaches the breakdown or ionizing voltage of gas tube 108. Capacitor 107 will then begin to recharge, drawing current through diode 105 and resistor 106 on each half cycle of line voltage when terminal 41 is positive.

When the anode-cathode section of silicon controlled rectifier 109 is made conductive by the flow of gate current, capacitor 103 discharges through rectifier 109 and the primary winding of transformer 104, the discharge current inducing a very high voltage in the secondary winding. Since capacitor 103 and the primary of transformer 104 form a parallel resonant circuit, the discharge of capacitor 103 will be the first half-cycle of an oscillation. When the charge on capacitor 103 falls to zero, the magnetic field in transformer 104 will start to fall and will induce in the primary winding a voltage of reverse polarity thus starting the second half-cycle of the same oscillation, the reverse voltage causing silicon controlled rectifier 109 to cut-off and at the same time causing capacitor 103 to charge again through diodes 101 and 102. Also on this second half-cycle of the oscillation a very high voltage of reverse polarity is induced in the secondary winding of transformer 104 thus causing the air gap between the spark electrodes to remain ionized although with a reversal of current flow.

The high voltage induced in the secondary winding is essentially sine-wave in shape with its rate of increase from zero being determined primarily by the resonant frequency of capacitor 103 and the inductance of primary winding with the secondary winding open-circuited. With the high secondary voltage connected to a pair of spark electrodes, as illustrated in FIGURE 1, when the secondary voltage reaches a value great enough to cause the air gap between the spark electrodes to ionize, a spark discharge occurs, the duration of which is determined by the value of capacitor 103, and the effective primary impedance of transformer 104 with the ionized air gap as the secondary load. The above values along with the voltage to which capacitor 103 is charged, is so chosen as to produce a spark discharge of sufficient energy and duration to allow the spark discharge to be deflected a significant amount by a rapid flow of air whose direction is normal to the axis of the air gap between the electrodes.

Figure 5:
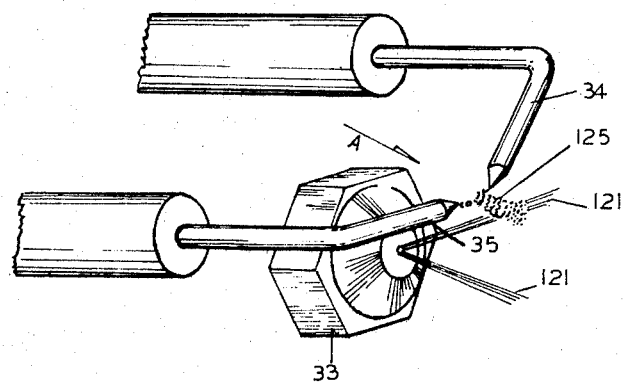
FIGURE 5 is a view of the relative positions of an oil burner nozzle, flow of air and spark electrodes indicating the manner in which the spark discharge is deflected by the air flow into the oil mist sprayed out of the nozzle so that oil cannot impinge on the electrodes.

In FIGURE 5, there is illustrated a nozzle 33 providing a conical spray pattern 121 which intersects the annulus of air, following arrow A, flowing around the nozzle. By locating the spark electrodes 34 and 35, in the airstream but outside the conical spray pattern 121, and by providing a sufficient ionization in the spark gap region, the moving airstream may be employed to deflect the spark into the oil mist of the conical pattern, as indicated at 125.

While a single embodiment with variations of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:
1. A fluid fuel burner and control having a burner, a fluid fuel control means therefor, a blower and driving motor, and sparking electrodes associated with the burner and comprising a first transformer, the primary winding of which is connected to first and second line voltage terminals; the secondary low-voltage winding of said first transformer having one lead connected to said second line voltage terminal hereinafter referred to as the common negative line and the second lead to the anode of a first diode rectifier; a first series circuit consisting of the anode and cathode of said first diode in that order to a first switch, a first resistor, a first capacitor, a second resistor to said second line voltage terminal, a first shunt connection consisting of a second capacitor whose first terminal is connected to the cathode of said first diode and whose second terminal is connected to said second line voltage terminal, a second series circuit from the junction of said first resistor and first capacitor consisting of the cathode and anode of a first Zener diode, a third resistor, a fourth resistor to a line connected to the junction of said first switch and first resistor and hereinafter referred to as the positive DC line, with a direct connection from the junction of said first capacitor and second resistor to the anode of said first Zener diode and to the base of a first NPN transistor; a third series circuit from the positive DC line to a fifth resistor, a sixth resistor, the base and collector of a second NPN transistor, a seventh resistor and a third capacitor to the common negative line with a second shunt connection from the junction of said fifth and sixth resistors consisting of the collector and emitter of said first transistor to the common negative line, with a third shunt connection from the base of said second transistor consisting of a fourth capacitor to the common negative line, the emitter of said second transistor being connected directly to the common negative line, and with a direct connection between the junction of said third and fourth resistors and the junction of said seventh resistor and collector of said second transistor; a fourth shunt connection from the junction of said first resistor, cathode of said first Zener diode and said first capacitor, consisting of a burner flame sensing photo resistive device to the common negative line; a fifth shunt connection from the junction of said seventh resistor and third capacitor consisting of the anode and cathode of a second rectifier in that order to the junction of said first resistor and first capacitor; a fourth series circuit connected from the anode of said second diode and consisting of the anode and cathode in that order of a third diode, an eighth resistor, the cathode and anode of a fourth diode to the junction of the anode of a second Zener diode and the base of a third NPN transistor, to the collector and emitter of a first PNP transistor, a ninth resistor, a tenth resistor, the collector and emitter of said third NPN transistor, all in that order to the common negative line, with direct connections between the base of said first PNP transistor and the collector of said third NPN transistor, between the junction of said ninth and tenth resistors and the cathode of said first diode rectifier, and between the cathode of said second Zener diode and the junction of said seventh resistor and third capacitor; a fifth series circuit connected from the junction of said seventh resistor and third capacitor and consisting of the seventh resistor, an eleventh resistor, a second switch to the common negative line with a sixth shunt connection from the junction of said eleventh resistor and second switch and consisting of the anode and cathode in that order of a fifth diode to the collector of said third NPN transistor and with a direct connection from the anode of said fifth diode to the base of a fourth NPN transistor; a seventh shunt connection from the cathode of said fourth diode consisting of a third switch to the common negative line, said second and third switches being both normally open and mechanically coupled to close simultaneously when manually operated; a sixth series circuit connected from the positive DC line and consisting of a twelfth resistor, the collector and emitter of said fourth NPN transistor, the gate and first anode of a triac, all in that order, to the common negative line; a spark discharge generator, said motor, and said fuel control means being connected in parallel and between the second anode of the triac, and said first line voltage terminal, and the output of said spark discharge generator being connected to said sparking electrodes.

2. For use in an oil burner ignition control system comprising a source of alternating current, a blower and motor, fuel oil supply, electrodes forming a spark gap, and a thermostatic switch, a unitary control circuit having connections adapted to extend to said source, motor and supply, spark gap electrodes, and thermostatic switch, said unitary control circuit having a spark ignition generator, means for deriving a direct current control circuit voltage from the source, and a resistor capacitor time delay circuit adapted to be connected to said control voltage through the thermostatic switch, a flame sensing device having high resistance when dark, and low resistance when illuminated, means connecting said flame sensing device across the capacitor of said time delay device to discharge the same in response to illumination, said unitary control circuit comprising a semi-conductor power switch for connecting the source to the motor and fuel supply and said spark ignition generator, and including means for rendering said power switch conductive in response to closure of the thermostatic switch and for energizing said time delay circuit, means responsive to the charging of said capacitance to a predetermined potential for rendering said power switch non-conductive, to open the circuit to the motor and fuel supply and said ignition generator in response to failure to establish burner ignition, and means responsive to the low resistance of said flame sensing device when illuminated for preventing the power switch from being rendered conductive upon closure of the thermostatic switch.

3. A control circuit in accordance with claim 2 wherein the ignition means comprises a capacitor discharge ignition generator.

4. A control system in accordance with claim 2 having lockout circuit means connected directly to the control circuit voltage independent of said thermostatic switch and adapted to maintain said power switch non-conductive, when rendered not conductive by failure of burner ignition, and when prevented from being rendered non-conductive by illumination of said flame sensing device when the thermostatic switch is closed.

5. For use in an oil burner ignition control system comprising a source of alternating current, a blower motor and fuel oil supply, electrodes forming a spark gap, a thermostatic switch and a flame sensing device having high resistance when dark, and low resistance when illuminated, a unitary control circuit having connections adapted to extend to said source, motor and supply, spark gap electrodes, thermostatic switch and flame sensing device, said unitary control circuit having a spark ignition generator means for deriving a direct current control circuit voltage from the source, and a resistor capacitor time delay circuit adapted to be connected to said control voltage through the thermostatic switch, means for connecting the flame sensing device across the capacitor of said time delay device to discharge the same in response to illumination, said unitary control circuit comprising a semiconductor power switch for connecting the source to the motor and fuel supply and said spark ignition generator, and including means for rendering said power switch conductive in response to closure of the thermostatic switch and for energizing said time delay circuit, means responsive to the charging of said capacitance to a predetermined potential for rendering said power switch nonconductive, to open the circuit to the motor and fuel supply and said ignition generator in response to failure to establish burner ignition, and means responsive to the low resistance of the flame sensing device when illuminated for preventing the power switch from being rendered conductive upon closure of the thermostatic switch.

6. A control circuit in accordance with claim 5, wherein the ignition means comprises a capacitor discharge ignition generator.

7. A control system in accordance with claim 5 having lockout circuit means connected directly to the control circuit voltage independent of the thermostatic switch and adapted to maintain said power switch non-conductive, when rendered not conductive by failure of burner ignition, and when prevented from being rendered non-conductive by illumination of the flame sensing device when the thermostatic switch is closed.

8. For use in an oil burner ignition system comprising a source of alternating current, an oil burner of the type having a nozzle adapted to emit a cone spray of oil, and an air blower adapted to produce an air stream in the general direction of the axis of the cone and an air spark gap located immediately outside of the cone spray and within the airstream, a spark generating apparatus comprising a capacitance, a step-up transformer, the primary of which is in series with the capacitance, and the secondary of which is connected to the air spark gap, means to unilaterally charge the capacitance from said source of alternating current, unidirectional means for repetitively discharging said capacitance through the transformer primary, and means oppositely unidirectional connected across the capacitance and primary to provide a low impedance path for oscillatory discharge of the capacitance and an oscillatory discharge at the air spark gap of a size and duration capable of being diverted by the air stream into the cone spray to ignite the oil.

9. A spark generating apparatus as set forth in claim 8 wherein the apparatus including the capacitance, capacitance charging means, transformer, discharging means, and low impedance path providing means is disposed in a space sufficiently small to permit the incorporation of ignition control circuitry in a common housing smaller than the space heretofore occupied by an alternating current line operated oil burner ignition transformer.

References Cited
UNITED STATES PATENTS

| | | | |
|---|---|---|---|
| 1,762,555 | 6/1930 | Kiefer | 158—28 X |
| 2,655,209 | 10/1953 | Newton | 158—28 |
| 2,985,797 | 5/1961 | Williams et al. | 158—28 |
| 3,027,933 | 4/1962 | Hearst | 158—28 |
| 3,238,992 | 3/1966 | Forbes | 158—28 |
| 3,318,358 | 5/1967 | Potts | 158—28 |

JAMES W. WESTHAVER, *Primary Examiner.*

U.S. Cl. X.R.

431—71, 79